Jan. 25, 1938.                    E. JACQUES                    2,106,603
                          AUTOMATIC VARIABLE SPEED GEAR
                            Filed April 20, 1936          2 Sheets-Sheet 1
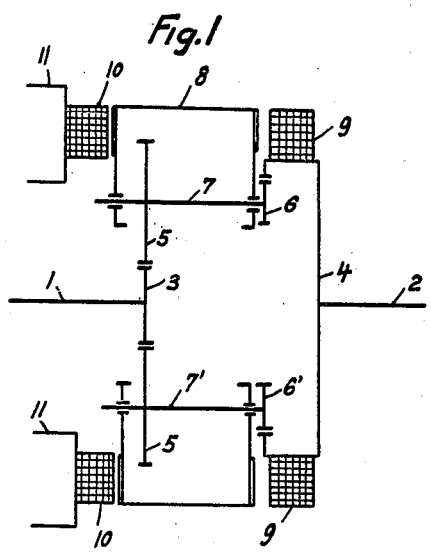
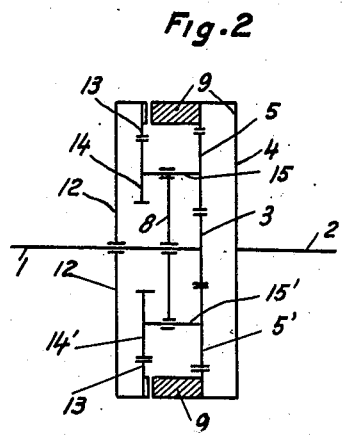
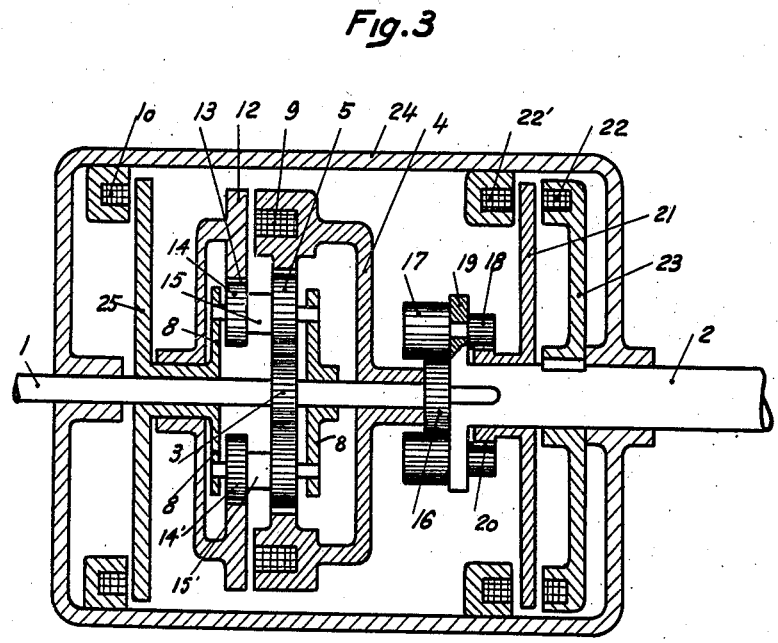
Inventor:
Emile Jacques
By
Williams, Bradbury, McCaleb & Hinkle
Attys Jan. 25, 1938.  E. JACQUES  2,106,603
AUTOMATIC VARIABLE SPEED GEAR
Filed April 20, 1936  2 Sheets-Sheet 2

Inventor.
Emile Jacques
By Williams, Bradbury, McCaleb & Hinkle
Attys.

Patented Jan. 25, 1938

2,106,603

UNITED STATES PATENT OFFICE 2,106,603

AUTOMATIC VARIABLE SPEED GEAR

Emile Jacques, Paris, France

Application April 20, 1936, Serial No. 75,257
In France April 27, 1935

1 Claim. (Cl. 74—259)

The present invention relates to a speed-changing device, particularly applicable to motor vehicles and the like and enabling the speed of the driven shaft to be automatically varied as a function of the reaction torque, and in inverse ratio thereto, the engine torque and the speed of the driving shaft being maintained at a constant value. In particular, the invention refers to a variable speed device of the type having what may be called a "receding reaction point", in which the point of application of the torque-reaction of the reduction gears is constituted by a member adapted to slip against an external resistance when the resisting torque exceeds a certain value.

Variable gears of this type are already known, which comprise a differential gear with sun wheels integral with the driving and driven shafts respectively, the planetary cage being subjected to a variable braking torque, as a function of the reaction effort and immobilizing said cage so long as the resisting torque is less than or equal to the driving torque, whilst allowing it to turn more or less rapidly when the resisting torque exceeds the driving torque, and thereby effecting a reduction in the speed of the driven shaft. In any event, the braking torque applied to the planetary cage, absorbs an amount of power which is proportional to the speed reduction obtained, and is entirely wasted. To recover this wasted power, it has been proposed to effect the braking by means of a generator—hydraulic or electric—coupled to the planetary cage in the differential and feeding a motor—hydraulic or electric—fixed on the driven shaft of the transmission. This arrangement enables the overall efficiency of the variable gear to be appreciably improved but it has the drawback of being bulky and expensive, because each of the two machines—generator and motor—serving to recuperate the energy lost in braking the planetary cage must be capable of taking the whole of the power transmissible by the variable gear.

The object of the present invention is to dispense with the employment of such a complicated recuperating system, by reducing the losses of power due to the shifting of the receding reaction point; and it is characterized by the fact that—instead of tending to immobilize the member serving as the reaction point—the external resistance is formed by a slipping clutch located between two rotating members of the device, these being connected respectively to the driving and driven members by transmission means which are so arranged that as soon as slipping occurs, their relative rotational velocity is very low in comparison with the relative velocity of the said driving and driven members.

For example, in a simplified embodiment, the device according to the invention is constituted by a differential with a high reduction ratio and whose smaller sun wheel is integral with the driving shaft and whose larger sun wheel is integral with the driven shaft; and having interposed between the sun wheel carried by the driven shaft and the planetary cage a clutch—for example, magnetic,—adapted to transmit a torque equal to the maximum resistance torque for which the device is designed.

By way of example, two embodiments of a device according to the invention are described below, and illustrated in the accompanying drawings.

Fig. 1 is a diagrammatic representation of the first embodiment; and Fig. 2 is a similar representation of the second embodiment.

Figs. 3 and 4 represent in longitudinal section, two variants in detail of an embodiment of the device in Fig. 2.

Figure 4:
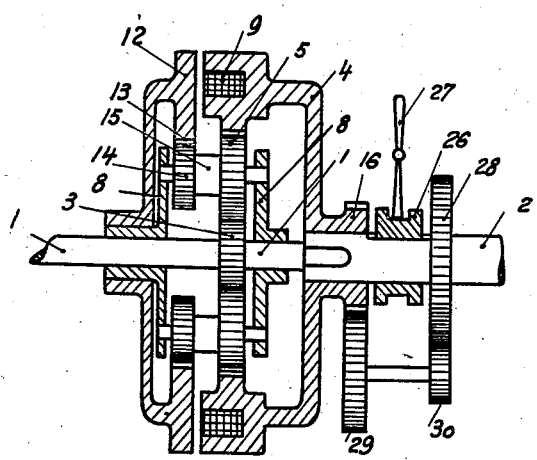

The device shown in Fig. 1 comprises, between the driving shaft 1 and the driven shaft 2, a differential of which the sun wheel 3, is fast on the driving shaft 1, and the orbit wheel 4 is fast on the driven shaft 2. The said differential has a very high reduction ratio, that is to say, the diameter of the sun wheel 3 is much less than that of the orbit wheel 4, these two wheels being connected by trains of double planet pinions 5, 6 and 5', 6', of which the planets 5, 5', meshing with the sun wheel 3 have a greater diameter than the planets 6, 6' meshing with the driven orbit wheel 4. In the example shown the differential has spur gearing; the shafts 7, 7' carrying the pairs of planets are parallel with the driving and driven shafts, and the orbit wheel 4 consists of a crown wheel with internal teeth. The differential may equally well be constructed with bevel gearing. Between the driven orbit wheel 4 and the planetary cage 8, is disposed a clutch 9 (preferably magnetic) adapted to transmit when slipping a torque exceeding the value of the driving torque, which must be kept constant, and equal to the maximum value of the resisting torque for which the apparatus is intended.

The device operates as follows. When the clutch 9 is energized, so long as the resisting torque applied to the shaft 2 is less than or equal to the driving torque applied to the shaft 1, no slip takes place and the differential rotates as a solid unit and causes the shaft 2 to be driven at the same speed as the shaft 1. When the resisting torque exceeds the driving torque, the clutch 9 begins to slip and the planetary cage 8 moves relatively to the driven orbit wheel 4 whose speed decreases and becomes inversely proportional to the value of the resisting torque.

The operation and advantages of the device according to the invention are explainable in the following manner.

Let $N_1$ represent the constant speed of the driving shaft 1; $N_2$ the speed of the driven shaft 2; $N$ the speed of the planetary cage 8; $k$ the speed reduction coefficient of the differential, and $n$ the ratio between the maximum value of the variable resisting torque $C_r$ and the constant value $C_M$ of the driving torque; so that the clutch 9 is able to transmit a torque equal to $nC_M$.

The ratio between three speeds $N$, $N_1$ and $N_2$ is given by the equation $$N = \frac{N_2 + \frac{N_1}{k}}{1 + \frac{1}{k}}$$

When the driven shaft 2 tends to be arrested by a resisting torque greater than the driven torque $C_M$, the planetary cage 8 tends to rotate at the speed $$N = \frac{\frac{N_1}{k}}{1 + \frac{1}{k}} = \frac{N_1}{k+1}$$

so that there is available on the planetary cage 8, a torque equal in value to $C_M(k+1)$, the result being that the cage 8 tends to take with it the driven orbit wheel 4 and therewith the driven shaft 2 through the motion of the clutch 9, the planets 6, 6' reacting against the driven orbit wheel 4, so long as the reaction torque $C_R$ does not exceed the value $nC_M$ of the torque which this clutch can transmit. It is thus evident that the device is substantially different from the known devices mentioned earlier in this description in that the external resistance provided by the clutch 9 acts, not as a brake, but as a means of transmission, and the planetary cage is not a braked, but a driving member.

The high efficiency of the device is explainable as follows. It is clear that the maximum loss of power will occur when the driven shaft 2 is completely arrested by a resisting torque of higher value than $nC_M$. This lost power will clearly amount to $$N \times nC_M = \frac{nC_M N_1}{k+1}$$

Since, on the other hand, the power applied to the device by the driving shaft is equal to $C_M N_1$, it is evident that the greatest loss corresponds to an infinite speed reduction and is equal to $$\frac{n}{k+1}\%$$

If a limited reduction is desired, enabling the value of the resisting torque to reach a maximum, for example of 5 times the value of the driving torque; and if the ratio of reduction $k$ is of the order of 100, it will be evident that the maximum loss will be of the order of only 5%, which is quite admissible.

To enable the device to function in reverse, a second clutch 10 is located between the planetary cage 8 and the frame 11, the de-excitation of the clutch 9 and the excitation of the clutch 10 clearly causing a reversal of direction of rotation of the shaft 2. The clutch 10 should be so designed as to allow no slip with the result that, in reverse drive, the device operates with a fixed reduction equal to $k$.

The arrangement shown diagrammatically in Fig. 2 consists as before of a differential with a high reduction ratio, the smaller sun wheel 3 being keyed on the driving shaft 1, whereas the larger orbit wheel 4 is keyed on the driven shaft 2 and the planets 5, 5' mesh simultaneously with the sun wheel 3 and the orbit wheel 4. Instead of disposing the slipping clutch between the driven orbit wheel 4 and the cage carrying the planets 5, 5', this clutch 9 is disposed between the orbit wheel 4 and an internally toothed crown wheel 12 mounted idly on the driving shaft 1 and the teeth 13 of which mesh with pinions 14, 14' keyed on the planet shafts 15, 15'. The crown wheel 12 performs the function of the cage 8 in the construction shown in Fig. 1. The ratios of the gears 5—4 and 14—13 differ, but are very close so that when slipping of the clutch occurs, the relative speed of the crown wheel 12 and the orbit wheel 4 is extremely low, even when the speed of the latter slows down considerably under the effect of a heavy resisting torque applied to the shaft 2.

The advantage of this form of construction resides in this, that the supplementary reduction represented by the gearing 14—13, disposed between the planetary cage and the slipping means 9, allows the dimensions of the pinions to be reduced, a lower reduction ratio for the differential properly so called, being employed.

In the example shown in detail in Fig. 3, the driven orbit wheel 4, instead of being keyed directly on the driven shaft 2, is connected with said shaft through a supplementary reduction device which, on the one hand, enables a smoother start to be effected and, on the other, facilitates adapting the running of the engine to the conditions under which the vehicle is being used (town, road, hills etc.) and also allows engine braking at a reduced speed. This auxiliary reduction device may also have a reduction ratio varying automatically with the resisting torque applied to the driven shaft, for which purpose it comprises a differential, of which one sun wheel 16 is integral with the orbit wheel 4, and whereof the planets 17, 18, are rotatable in a cage member 19, integral with the driven shaft 2 and whereof the other sun wheel 20 is integral with a disc 21 which can be held solid, with a disc 23 keyed on the driven shaft 2, by means of a magnetic clutch 22. Another clutch 22' enables the disc 21 to be held solid with the fixed housing 24. Finally, for reversed running, clutch 10 as before enables a disc 25 to be held solid with the housing 24, the disc 25 being integral with the cage 8 carrying the planet pinions 5, 14, 5', 14' of a differential, which is free on the driving shaft 1.

The auxiliary reduction device may also take the form of a train of gears controlled by hand as shown in Fig. 4, a dog clutch 26, actuated by the lever 27 enabling either the pinion 16—integral with the orbit wheel 4—or a pinion 28—connected with a pinion 16 by the intermediary reduction gearing 29—30—to be fastened on the driven shaft 2.

Figure 5:
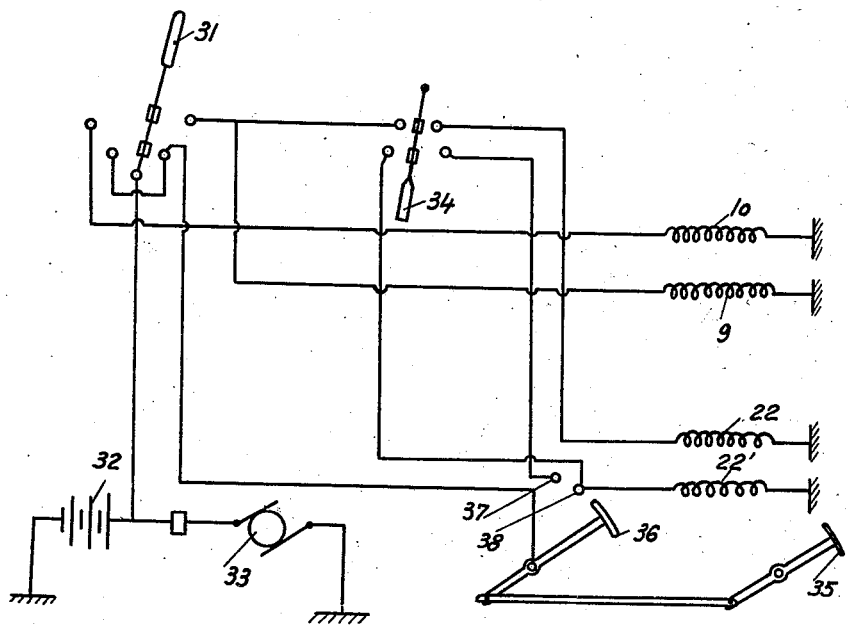
Fig. 5 is the electric circuit diagram for the case in which magnetic clutches are used.

Fig. 5 is a diagram of the connections and controls of the several clutches. A lever 31 enables either the clutch 9 (for forward running), or the clutch 10 (for reversing) to be connected to a battery 32, or to the dynamo 33. A manually operated switch 34 serves for energizing either the clutch 22 of the auxiliary reduction device for use in traffic or the clutch 22' for hillwork which also allows of engine braking. The energizing of these two coils 22, 22', is also controlled by the brake pedal 35 of the vehicle, through the agency of the movable sector 36, in constant connection with the battery, and of the contacts 37, 38 respectively connected with the windings 22, 22'. This control allows braking and progressive resumption of drive to be effected irrespective of the running condition (traffic or hill work), selected by means of the switch 34.

What I claim is:—

Automatic change speed mechanism whose speed reduction ratio is a function of the resisting torque, comprising a driving shaft, a driven shaft, differential gear means with a high ratio of reduction including a small sun wheel fast on the driving shaft, an orbit wheel fast on the driven shaft and having a greater diameter than the said sun wheel, planet pinion means engaging said two wheels; a disc mounted idly on the driving shaft and including an internally toothed crown gear, pinions integral with the said planet pinion means and engaging said crown gear, the tooth ratio of said pinions and crown gear being different from, but close to the tooth ratio of the planet pinion means and the orbit wheel, and a slippable clutch operative between said disc and the orbit wheel, said clutch being adapted to transmit when slipping a torque equal to the maximum torque applied to the driven shaft.

EMILE JACQUES.